Figure 1:
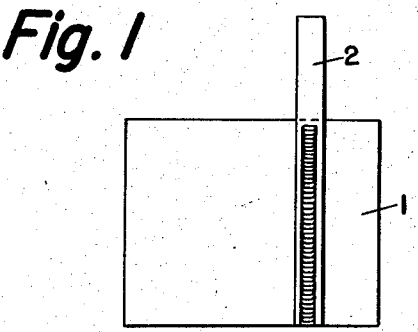

April 21, 1959     K. RUETSCHI ET AL     2,883,443
LEAD-ACID STORAGE BATTERY

Filed July 13, 1956     2 Sheets-Sheet 1

April 21, 1959 K. RUETSCHI ET AL 2,883,443
LEAD-ACID STORAGE BATTERY
Filed July 13, 1956 2 Sheets-Sheet 2

United States Patent Office 2,883,443
Patented Apr. 21, 1959

2,883,443

LEAD-ACID STORAGE BATTERY

Karl Ruetschi, Schafisheim, Switzerland, and
Paul Ruetschi, Glenside, Pa.

Application July 13, 1956, Serial No. 597,787

4 Claims. (Cl. 136—68)

This invention relates to secondary storage batteries of the lead-acid type, more particularly to methods of and means for producing batteries with high power output at a minimum of production cost.

Present methods of preparing the pasted plates of modern storage batteries involve the use of active materials of litharge or red lead, water and sulfuric acid. The litharge employed often contains a proportion of finely divided metallic lead which aids in obtaining stronger plates. The negative plate material usually contains a small portion of so-called expanders to increase capacity, consisting of blanc-fixe, i.e., barium sulphate, carbon black, and organic ligneous material. The paste of the active material is applied to lead antimonial grids. After assembly of the groups of pasted plates with insulating separators, the cells of modern storage batteries are filled, conventionally with sulfuric acid of a specific gravity of about 1.100 grams/liter and the negative sponge lead and positive lead peroxide electrochemically formed by applying a charging current.

The principal object of the present invention is to provide a storage battery which can be fabricated automatically on a running belt process with a minimum of labor and plant investment. It is a further object of the invention to produce a battery with a minimum amount of lead per amp-hour capacity at high rate discharges. In this new process the milling of the oxide, the casting of the grids, and the pasting operations are omitted. Instead, the active material on the negative and positive plates is produced with a Planté-type formation.

Those skilled in the art have for some time recognized the fact that the thinner the plates, the more efficient the use of the active material in the plates of a lead-acid battery during high rate discharges. Conventional methods of preparing pasted plates of modern storage batteries do not allow a material decrease in plate thickness below the present standards. It is not deemed possible efficiently to cast very thin grids. Moreover, thin plates are difficult to handle and to assemble. With standard methods of manufacturing storage batteries, a decrease in plate thickness and a corresponding increase in the number of plates per cell would increase the price of the battery substantially, in spite of the fact that with the use of thinner plates lead could be saved.

In carrying out the present invention, a high power output storage battery comprises positive electrodes and negative electrodes characterized by the fact that said electrodes are fabricated from thin lead foils. These foils may preferably have a thickness between 0.004" and 0.03". The lead foils can be produced continuously by a conventional rolling process. The foils are cut in size of storage battery plates, electrically connected to current leads, and piled up with intervening insulating separators to form cells.

Figure 2:
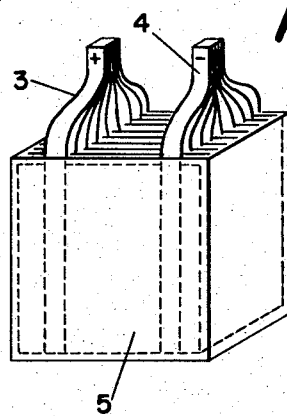
Figure 3:
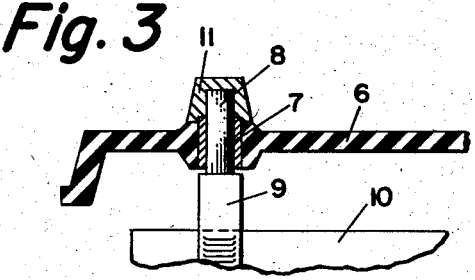
Figure 4:
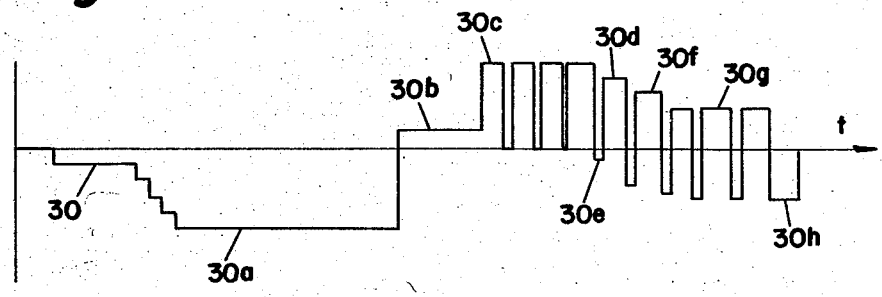
Figure 5:
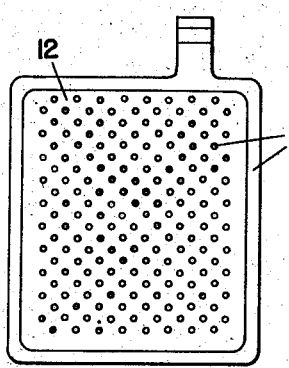
Figure 6:
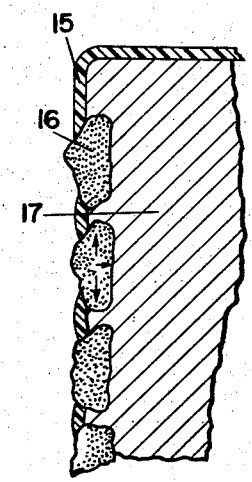
Figure 7:
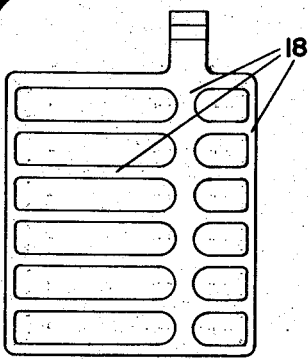
Figure 8:
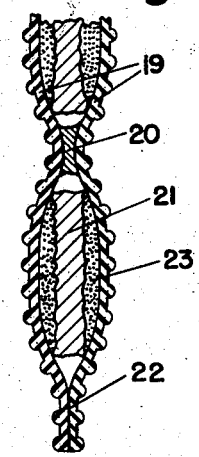

For a more detailed understanding of the present invention and for further objects and advantages thereof, reference is to be had to the following description taken in conjunction with the accompanying drawings, in which:

Fig. 1 is a front view of a foil-type electrode;
Fig. 2 is a view in perspective of a cell;
Fig. 3 is a cross-sectional view of the current connection to the post according to the invention;
Fig. 4 is an example of a current time diagram of the formation procedure;
Fig. 5 is the front view of the foil-type of electrode of Fig. 1 after application of lacquer thereto;
Fig. 6 is a cross-sectional view of the foil-type of electrode of Fig. 5 after formation;
Fig. 7 is the front view of a foil electrode according to another embodiment of the invention; and
Fig. 8 is a cross-sectional view of a foil electrode in accordance with another modification of the invention.

It has been known for a long time by those skilled in the art that the active material of positive plates or electrodes can be formed directly from metallic lead by Planté formation. Starting with very thin lead foils, it is possible to produce very thin storage battery plates. In order to provide a fast attack (fast charging) during anodization, a formation additive such as nitric acid or perchloric acid must be applied. Conventional formation electrolytes for Planté-type formation are, e.g., a solution of 160 grams sulfuric acid and 12.5 grams sodium perchlorate per liter, or sulfuric acid sp. gr. 1.16 with 3 ccs. of nitric acid sp. gr. 1.40 per liter. In case sodium perchlorate is used, the plates must be washed after formation in order to remove the perchlorate ions, which are detrimental to the grids of the battery. Nitric acid is a preferred additive because it is used up during formation by reduction at the negative plates and can, therefore, have no effect on grid corrosion during subsequent operation of the battery.

There are two main problems encountered in the fabrication of a foil type battery which have up to date prevented a development of said battery type. These problems are: (a) the current connection to the foil, and (b) the shedding of the positive active material. Included in the present invention are means for overcoming these difficulties.

In producing a lead-acid battery according to the present invention, a foil of pure lead, preferably a corrosion-resistant lead alloy with low antimony content, of the height and width of the battery plates to be produced, is used.

Referring now to Fig. 1, a current lead 2 is mounted onto the foil 1 such that there is a good electrical contact between the foil and the current lead. It is a principal object of the present invention in one form thereof that the current connector 2 is mounted on, or secured to, the foil 1 by electric resistance welding. A conventional welding machine fitted out with a light movable electrode can be used. A special, relatively low pressure and low current program must be applied in order to obtain perfect welding. Keeping in mind the low pressure and the low current, satisfactory welds may be obtained throughout the area of the flat rectangular foil strips over the area where they overlie the foil-plates 1, for example by seam welding. Specifically, values of current and, specifically, values of pressure will vary with the material used, welding time and form of the welding electrodes. For example, if the foil-plates 1 and the foil-current connections 2 both be of pure lead, the pressure will be somewhat lower and with somewhat lower currents than if the foil material be of antimonial lead or other of the well-known lead alloys used in lead-acid storage batteries. For a welding time of 0.05 sec. the current may be about 600,000 A. per sq. in., the pressure about 6,000 pounds per sq. in., the area of a single welding point being in the order of 0.01 sq. in. The current connector 2 is a foil of pure lead, or of the above-mentioned antimonial alloy, with a thickness of 0.008" to 0.06". The cross-sectional area of the current connector 2 must correspond with the magnitude of the current to be carried. The negative and positive plates are manufactured in the same way. The foil of the positive plate is preferably somewhat thicker than the foil of the negative plate, since the positive foil will corrode during operation of the battery and the length of its life will determine the life of the battery. The foil 1 may be perforated in any desired way to increase the adherence of the active material and to save lead. The foil may also be treated in other ways to provide better adherence of the active material and better acid and gas circulation at the surface of the plates. Such a treatment may include corrugation of the foils. The foil 1 may also be heat-treated, annealed and/or quenched, in order to increase the corrosion resistance. Such a heat treatment will relieve the stresses and strains in the foil and will beneficially change the grain size and impurity concentrations in the grains.

Negative plates, separators, and positive plates are piled by turns in an automatic process to form cell units. A cell unit 5 is shown schematically in a perspective view in Fig. 2, where 3 are the positive connectors and 4 are the negative connectors, the cell including the pile of positive and negative plates and intervening separators. The separators have somewhat larger dimensions than the plates. The piles can be held together with plastic or rubber bands.

It is a further object of the present invention in one form thereof to provide current connectors of both the positive and the negative plate sets pressed together at their free ends to form a solid shape in which the individual connectors are united. The pressed solid and united part of the current connectors is inserted into the cover of the battery and welded to the cover inserts. The foregoing has been illustrated for the positive plate set in Fig. 3, where 6 is the insulating cover of the battery, 7 is a cover insert of lead, 8 is the pressed part of the connectors, preferably cylindrical, 9 are the current connectors, 10 are the battery plates, and 11 is the post. The post 11 is welded onto the cover insert 7 in a conventional manner. For clarity, there have been omitted from Fig. 3 the separators.

It is a further object of the present invention that the cells are formed after the assembling operation in a formation electrolyte which preferably contains nitric acid as a formation additive. The separators used must, of course, be inert against diluted nitric acid. They may be made of glass mats, polyvinyl chloride and the like. In order to produce a porous and adherent layer of oxide on the plates, a special formation program has to be applied.

For maximum uniformity in the active materials, it is preferred that there be initially applied to the plates a charging current which tends to produce $PbO_2$ at the positive plates and which causes evolution of hydrogen at the negative plates. It is essentially a cleaning process for the negative set of plates, and thus the charging current duration need be only of the order of ten minutes. After the initial charging for anodization of the positives and cleaning of the negatives, the current program shown schematically in Fig. 4 will be utilized. In Fig. 4 the applied currents are plotted against time.

Those skilled in the art will understand that the particular values of charging current will depend upon the design capacity of each battery, particularly in terms of the size of the battery plates. Suggestions as to charging currents are later set forth. After the cleaning step, the charging current, as shown in Fig. 4, will be negative, meaning in a direction to produce anodization of the negative set of plates. The charging current will first be relatively small. It will then be increased preferably by a series of steps to a maximum value as indicated at 30a. The anodization of the negatives will continue for a relatively long period of time, which as indicated below, for an 85 ampere-hour battery will be of the order of five hours and with a charging current of the order of 60 amperes.

The charging current is then reversed as indicated at 30b for conversion of the lead oxide formed at the negatives to pure lead and for anodization at a low rate of the positive set of plates. The initial anodization of the positives will be continued for at least 20 minutes. At that time, the level of charging current will be increased as indicated at 30c. Thereafter, the charging current will consist of current pulses in the forward direction for anodization of the positive set of plates with each pulse having an amplitude of a much higher order, 60 amperes for the 85 ampere-hour battery.

These high amplitude pulses are applied for time intervals of the order of one minute or less. The time duration of these high amplitude pulses is not critical, and they can be applied during time intervals varying from one-half second up to sixty seconds, it being preferred that they be applied for some seconds. After a number of high amplitude pulses the charging current is gradually reduced as indicated at 30d. The charging current is not only reduced in amplitude for the successive pulses, but it is also reversed to provide negative pulses 30e of shorter duration than the positive pulses. Thus, during the subsequent charging there will be a net anodization of the positives with a discharge occurring between each charging pulse. As the charging cycle is completed, the pulses will have been reduced to those indicated at 30f and at 30g.

It is to be observed that the charging cycle is completed with the application of the negative pulse 30h which may be of the order of 30 amperes for a time interval which is not critical but which will be found satisfactory if of the order of ten to fifteen minutes. The effect of the terminal pulse 30h of the formation cycle is to reduce somewhat the charge on the positive plates. This reduction will result in less sloughing or loss of active material during later cycle life. Summarizing, it will be seen that the current used during formation of one (the positive) plate set is not a direct current but an interrupted or square wave current composed of positive and negative current pulses. It has been found that the $PbO_2$ layers formed with such a current are more porous and more adherent than the layers formed in conventional manner with a direct current. The current pulses in the forward direction may extend from 0.5 second to 50 seconds; the time periods of current interruption or reversal of the current may extend from 0.1 second to 10 seconds. A layer of $PbO_2$ may be formed on the negative plates with a direct current. The cell is later reversed with an interrupted or square wave current consisting of positive and negative current pulses. In general, a layer of $PbO_2$ is always formed first on the negative plates. The cell is thereafter reversed and the $PbO_2$ is reduced to sponge lead. During reversal of the cell, a $PbO_2$ layer is formed on the positive plates. Ligneous material such as calcium-ligno-sulfonate, stibex, marasperse, meadol, and suspensions of lampblack and barium sulfate may be added to the electrolyte during reversal in order to keep the lead particles in the sponge lead small and to increase capacity. If nitric acid is used as a formation additive, it should be removed or used up at the end of reversal. Nitric acid is not used up during reversal since the negative electrode has to convert first from $PbO_2$ into Pb before reduction of the nitric acid sets in. It is important that the formation of each plate set is started with relatively small currents. The currents are subsequently increased. The applied currents are in the range between 0.002 and 0.5 amp./sq. in.

At the end of the formation process, the cell may be given a wash. Furthermore, the various treatments corresponding to the setting process used in conventional automobile battery production can be applied to increase the cohesion among the particles of the active material. After the setting process, the cells are charged in diluted acid. Using interrupted or square wave currents during formation, it has been possible to produce porous and adherent layers of positive and negative material with capacities as high as 645 ampere-seconds per square inch, or 0.18 amp.-hr./sq. in. on a foil which a thickness of only 0.01". These results are considered as indicative of the performance to be expected. It can probably be improved. The depth of formation will determine the life of the positive plates. It is within the true spirit of the invention electrochemically to form the lead foil prior to assembling of the cell.

In order to decrease the shedding of the positive active material during cycle life of the battery, it is a further object of the present invention to spray the plates before formation with a lacquer such that part of the surface is covered with fine drops. Formation is prevented under the lacquer. The lacquer used has to be inert against acid and oxidation. Such a lacquer may consist of a solution of an organic polymer. Commercially available products such as Aethoxylin-resins may be used also. A storage battery plate sprayed with lacquer in the described way is shown in Fig. 5, where 12 is the plate and 13 are the spots covered with lacquer.

In order to explain the action of the lacquer in more detail, reference is made to Fig. 6. This figure is a cross-section through a plate which has been treated with lacquer prior to formation. The active material is held in pockets 16 between the spots 17 where the attack of the plate was prevented by the lacquer 15. The attack of the lead proceeds during formation not only vertically to the plate surface, but also, or even preferably, parallel to the surface. The arrows in Fig. 6 show the direction of the attack. Since the active material is held in pockets, the shedding is prevented and capacity and cycle life are increased. It is within the spirit of the invention that said lacquer drops form a bond to a thin separator so that the separator is held in place by said lacquer and joined to the lead foil at certain spots.

In another embodiment of the invention, the lacquer is applied in strip-form as shown in Fig. 7. The parts covered by the lacquer 18 are not attacked during formation. Therefore, current leads under the lacquer with low electrical resistance are provided from all the parts of the plates to the current connectors. The painted strips also increase the resistance against shedding. It is, of course, important that the size of the covered parts of the plates be such that there is sufficient amount of surface kept free for the electrochemical and electrolytic mass transfer. It is particularly advantageous to paint the edges of the plates and also the current connectors with lacquer.

In a further embodiment of the invention, perforated lead foils are used and the separators on each side of the plate are welded or bonded together across the holes in the plates. The foregoing is illustrated in Fig. 8. The contacts 20 where the separators 19 are joined together are then completely independent of the corrosion of the lead foil 21. The separators can also be secured together along the edges 22 of the plate to form a closed pocket for the active material 23. Instead of bonding, as by welding, other methods such as sewing, glueing and riveting may be used to join the separators together.

From the foregoing, it is evident that a foil-type battery according to the present invention can be fabricated fully automatically on a running belt-process. Such an automatic fabrication includes:

(1) Preparation of long foil-strips by a rolling process, the width of the strips corresponding to the height of the battery plates to be produced. Preparation of long foil-strips for the current connectors, the width being approximately equal to the diameter of the cover inserts.

(2) The foil-strip for the current connector is cut in pieces and these pieces are welded onto the foil-strip for the plates in regular distances; these distances being equal to the width of the battery plates to be produced.

(3) The foil-strip with the current connectors in place is rolled again to make the thickness of the plates more uniform. The foils are then corrugated, perforated, brushed (cleaning) or otherwise treated mechanically according to the special application.

(4) The edges of the plates, the current connectors, and the spots all over the plate are covered with a resistant lacquer.

(5) The lacquer is dried and consolidated on or burned in the foil in a tunnel-oven.

(6) The foils are cut into pieces with a length corresponding to the width of the battery plates to be produced. The plates are piled in turn with separators to form cells.

(7) The free ends of the current connectors of each plate set are pressed together, for example, into cylindrical form. The solid cylinders are inserted into the cover inserts and welded to posts. The current connectors under the cover are covered with sealing compound, in order to increase mechanical strength and corrosion resistance.

(8) The cells are formed in formation electrolyte with the special current-time program described above.

(9) The cells are washed.

(10) The cells are given a setting process.

(11) The cells are assembled into containers.

(12) The cells are charged in diluted acid, and finally in more concentrated acid.

Now that the principal features of the invention have been discussed, application to automobile batteries will be described in more detail. A 6 volt automobile battery with 85 ampere-hours capacity at the 20 hour rate at 80° F. can, e.g., be built using 20 positive plates of a thickness of 0.009" and 21 negative plates of a thickness of 0.007" in each cell, the dimensions of the plates being conventional, 12 cm. in width and 14 cm. in height. An embossed separator should be used to assure free circulation of the electrolyte during formation. A separator may be combined with a thin mat of glass or plastic material against the positives. The current connectors welded on the positive and negative foils should have a total length of about 7.8" and a width of 0.55" and a thickness of 0.02".

After the piling process, the ends of the connectors of each of the positive and negative plate sets are pressed into the form of a cylinder, such that this cylinder can be pushed conveniently into the cover inserts of the covers. The pressed cylinders can then be welded to the inserts and the posts built up in a manner known by those skilled in the art.

The assembled cells are inserted into the formation electrolyte consisting, e.g., of sulfuric acid sp. gr. 1.16 dosed with 3 ccs. of nitric acid per liter and may be formed applying, for example, the following current program:

Anodization of the positives with 10 amperes for 10 minutes.

Anodization of the negatives with 1 ampere for 20 minutes.

Anodization of the negatives with 5 amperes for 20 minutes.

Anodization of the negatives with 10 amperes for 10 minutes.

Anodization of the negatives with 40 amperes for 1 hour.

Anodization of the negatives with 60 amperes for 5 hours.

A similar procedure may be applied during the formation of the positives, that is, during reversal of the cell. In the latter case the current may consist of current pulses in the forward direction of the listed values and of times between 0.5 and 50 seconds and of reversed pulses equal or smaller than the forward pulses and of times between 0.1 and 10 seconds. At the end of the formation process, the nitric acid concentration in the electrolyte should preferably be very low. The cells are then washed, conditioned (setting process), and dried at temperatures not high enough to be harmful to the separators. The performance data of the described battery will now be compared with the data of a conventional 6 volt battery, in Table 1.

Table 1

|  | Conventional Battery | New Foil Type Battery |
|---|---|---|
| Capacity at 20 hour rate at 80° F. (5 amperes)___ah__ | 100 | 85 |
| Capacity at 5 min. rate at 0° F., 300 amperes___min__ | 4 | 6 |
| Total lead per battery_____lb__ | 19.37 | 13.0 |
| Total weight of battery_____lb__ | 40 | 32 |
| Capacity 5 min. rate/Capacity 20 hr. rate_percent__ | 20 | 35 |
| Self-discharge, Percent Capacity loss in 4 weeks at 95° F_____percent__ | 25 | 25 |
| Five second voltage at 0° F., 300 amperes___volts__ | 4.5 | 5.3 |
| Cycle life, SAE cycles: 5 hour charge 10 amperes_____ 1 hour discharge 40 amperes_____ | 300 | 300 |
| Overcharge life test (weeks) 9 amperes continuously_ | 15 | 20 |

The foil type battery compares even more favorably with conventional batteries if 12 volts units are considered. In conventional batteries, only 50% of the active material is used up at a 20 hour discharge at 80° F., but in the new foil type battery, 80% of the active material is used under the same conditions. The amount of lead used per ampere-hour of stored capacity is minimized by using the foil principle. For a battery with 85 ampere-hour capacity only 13.0 lbs. of lead are required, namely, 8.90 lbs. for the foils, 3.10 lbs. for the current connectors, and .90 lb. for the posts and the cell connectors.

What is claimed is:

1. A storage battery of the lead-acid type comprising a negative electrode and a positive electorde characterized by the fact that each plate of each said electrode comprises a single thin foil of lead, current connectors in the form of thin lead strips welded to said foil electrodes, said electrodes being partially covered by an inert lacquer in order to prevent anodic attack and corrosion of the metallic lead under the lacquer during initial electrochemical formation, and a separator, said lacquer holding said separator in place on at least one of said foils and said separator being joined through said lacquer to at least one of said foils at certain spots.

2. A storage battery of the lead-acid type comprising a plurality of positive plates, a plurality of negative plates, a plurality of insulating separators, said plurality of negative plates being disposed in face-to-face relation with said plurality of positive plates with one of said plurality of insulating separators interposed between adjacent positive and negative plates, each of said positive and negative plates consisting of a single foil of lead with a thickness between about 0.004" and about 0.03", and current connectors each consisting of a thin strip predominantly of lead respectively welded to said plates, all of the current connectors welded to said positive plates being electrically connected together and all of said current connectors welded to said negative plates being electrically connected together, said electrically connected current connectors respectively forming the positive and negative electrodes of the battery, said negative and positive plates being further characterized by active material produced by an electrical formation process of the Planté type.

3. A storage battery of the lead-acid type comprising a plurality of positive plates, a plurality of negative plates, a plurality of insulating separators, said plurality of negative plates being disposed in face-to-face relation with said plurality of positive plates with one of said plurality of insulating separators interposed between adjacent positive and negative plates, each of said positive and negative plates consisting of a single foil of lead with a thickness between about 0.004" and about 0.03", and current connectors each consisting of a thin strip predominantly of lead respectively welded to said plates, all of the current connectors welded to said positive plates being electrically connected together and all of said current connectors welded to said negative plates being electrically connected together, said plates respectively electrically connected together by said current connectors respectively forming the positive and negative electrodes of the battery, said negative and positive plates being further characterized by active material produced by an electrical formation process of the Planté type, said foil plates having distributed thereover in spaced relation one with the other small drops of an inert lacquer adhering thereto to prevent anodic attack at the locations of said drops during said formation of said foils.

4. A storage battery of the lead-acid type comprising a negative electrode and a positive electrode characterized by the fact that each plate of each said electrode comprises a single thin foil of lead, current connectors in the form of thin lead strips welded to said foil electrodes, said electrodes being covered at their edge portions and at a plurality of points on their faces being covered by an inert lacquer adhering thereto in order to prevent anodic attack and corrosion of the metallic lead under the lacquer during initial electrochemical formation of said foils.

References Cited in the file of this patent

UNITED STATES PATENTS

| 285,807 | Fox _____ Oct. 2, 1883 |
| 544,673 | King _____ Aug. 20, 1895 |
| 621,048 | Elieson _____ Mar. 14, 1899 |
| 700,210 | Lombard _____ May 20, 1902 |
| 711,537 | Sedgwick _____ Oct. 21, 1902 |
| 1,522,613 | Cole _____ Jan. 13, 1925 |
| 2,256,105 | Shank _____ Sept. 16, 1941 |
| 2,422,130 | Proctor _____ June 10, 1947 |
| 2,503,179 | Tichenor _____ Apr. 4, 1950 |

OTHER REFERENCES

Vinal, G. W.: "Storage Batteries," John Wiley & Sons, New York, 1955, ed. 4, pages 8 and 48–49 (Scientific Library, Call No. QC605v54, 1955).